April 3, 1973 M. S. MINTZ 3,725,235
DYNAMICALLY FORMED ELECTRODIALYSIS MEMBRANES
Filed March 23, 1971 3 Sheets-Sheet 1
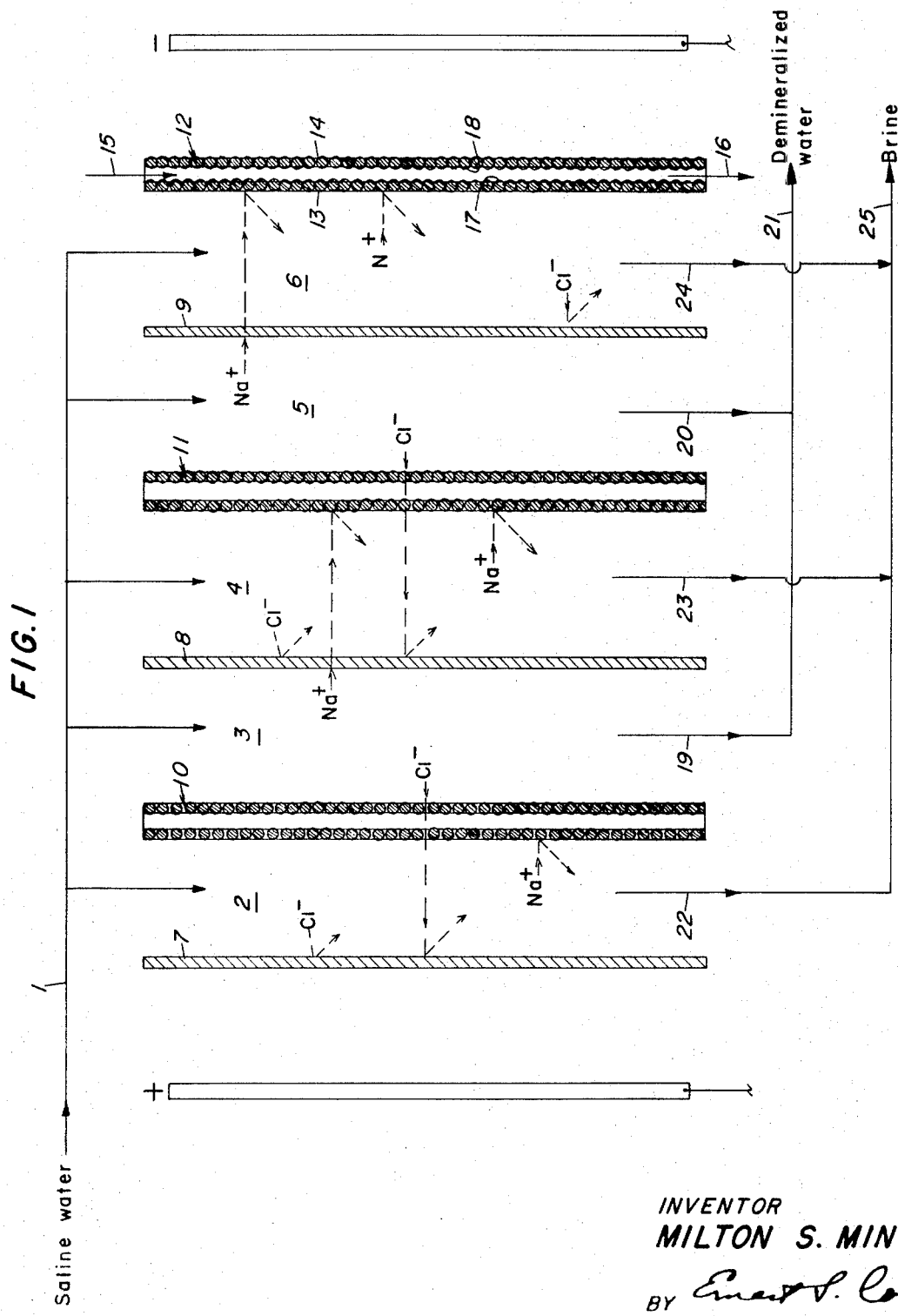
INVENTOR
MILTON S. MINTZ
BY Ernest F. Cohen
ATTORNEY

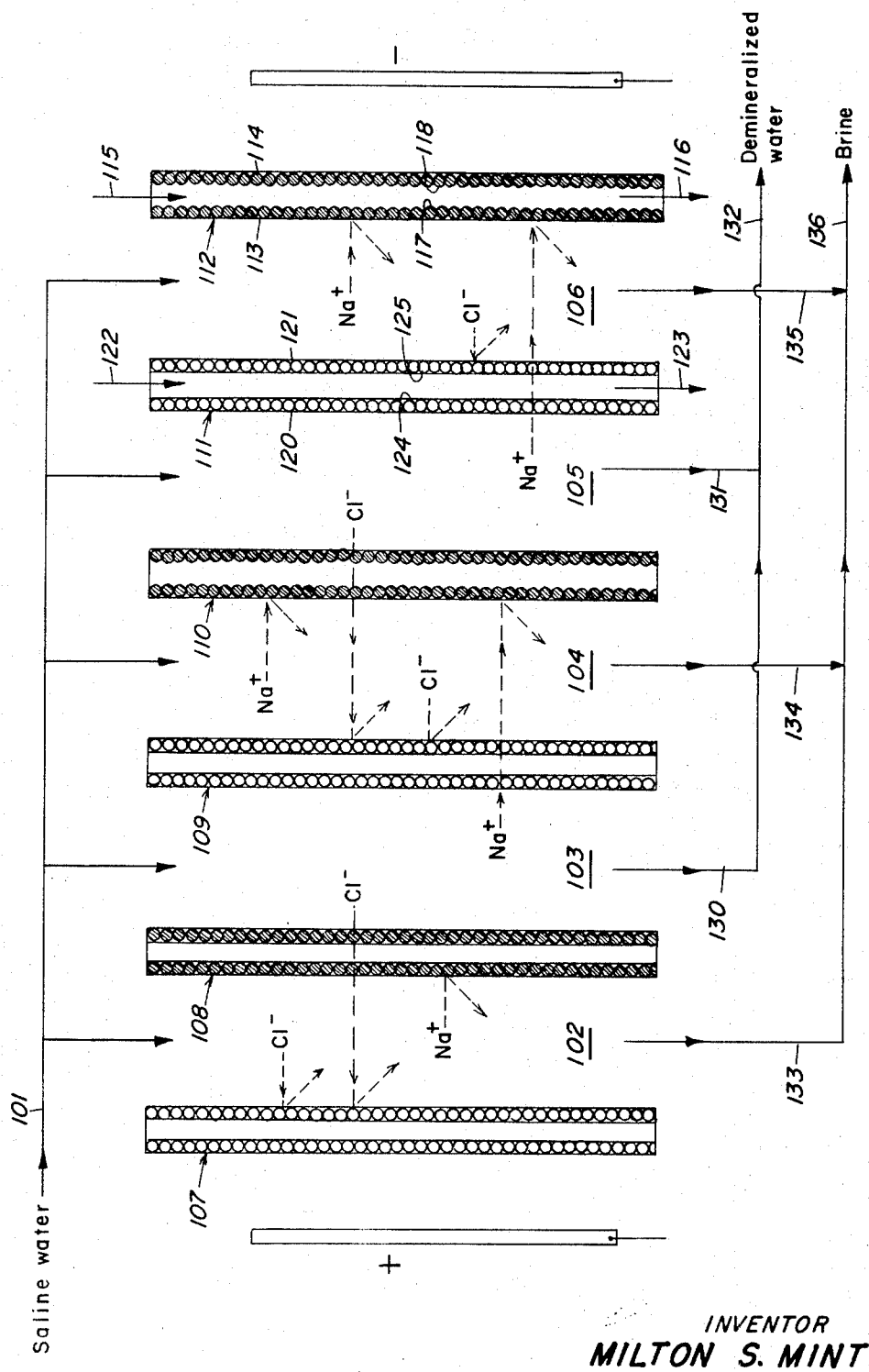

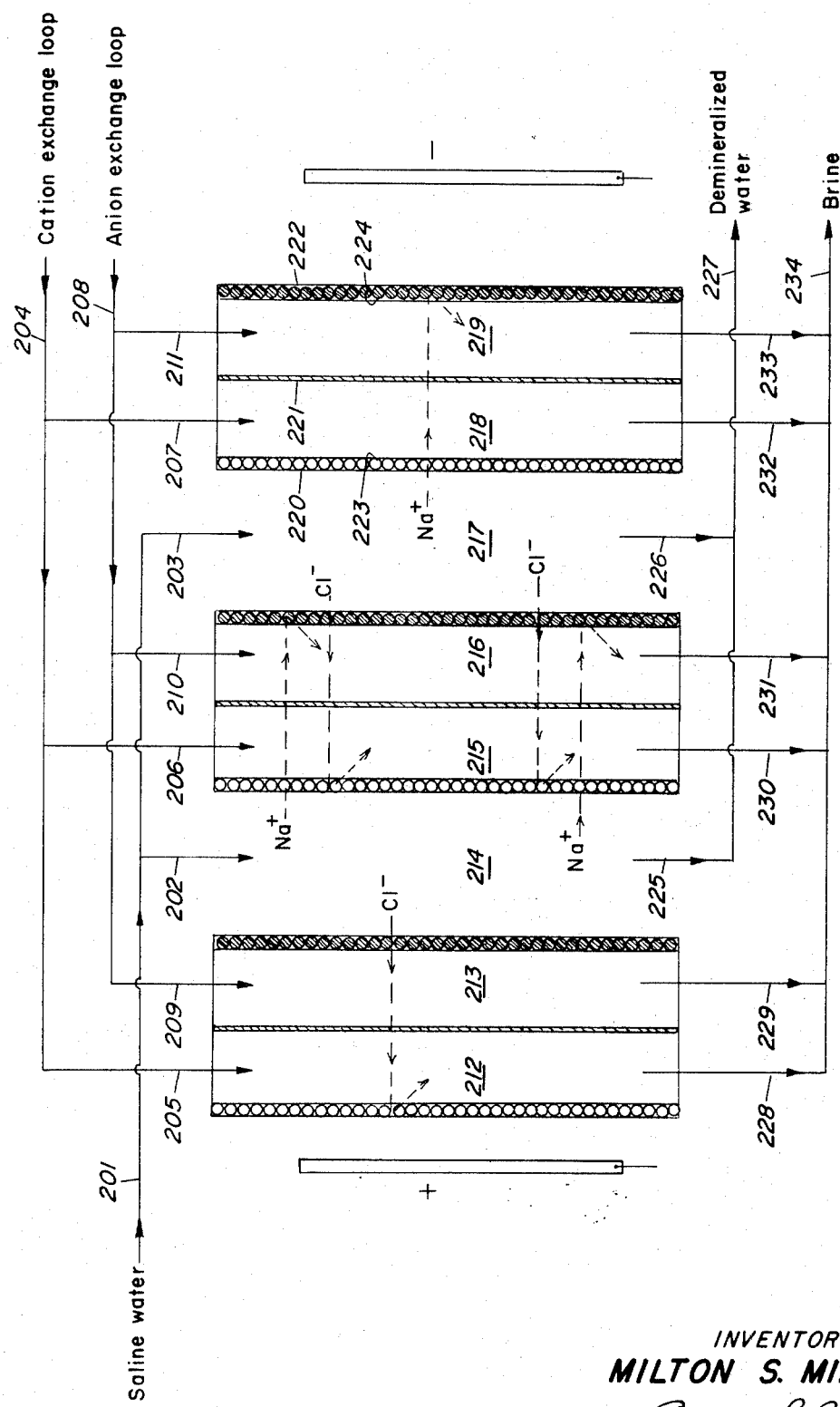

United States Patent Office 3,725,235
Patented Apr. 3, 1973

3,725,235
DYNAMICALLY FORMED ELECTRODIALYSIS MEMBRANES
Milton S. Mintz, McLean, Va., assignor to the United States of America as represented by the Secretary of the Interior
Filed Mar. 23, 1971, Ser. No. 127,100
Int. Cl. B01d 13/02; B01k 5/00
U.S. Cl. 204—180 P                    18 Claims

ABSTRACT OF THE DISCLOSURE

Electrodialysis membranes are formed in situ by contacting an aqueous suspension of an ion exchange resin with a support material prior to application of an electrical potential across the separation unit.

BACKGROUND

The search for an economical method of purifying commercial quantities of saline water has led to three major types of processes—distillation, reverse osmosis, and electrodialysis. Possibly the oldest known method for separating a pure solvent from a solution, distillation is based on the difference in the vapor pressures of the component materials. Although the commercial desalination processes based on distillation are complex, they all rely on the principle that if enough heat is applied to a saline solution pure water may be vaporized leaving behind a more concentrated brine. Eventually, if all the water is vaporized, only crystalline sodium chloride and other salts will remain.

Reverse osmosis and electrodialysis are both characterized as membrane processes, but their principles of operation are completely different. In reverse osmosis saline water is forced against a membrane at a pressure greater than osmotic. Being selective, the membrane allows pure water to pass through and be collected on the opposite side, but it rejects the passage of salt. A good reverse osmosis membrane allows the free flow of water while being as close to completely salt impermeable as possible.

Electrodialysis is in many respects the complete opposite of reverse osmosis. The driving force is an electrical potential rather than a mechanical pressure. Electrodialysis membranes are basically impermeable to water but allow the movement of ions from one side to the other. Thus, in electrodialysis an electrical potential is applied across the saline water. Positive ions such as sodium are attracted in one direction while negative ions such as chloride migrate in the opposite direction. By providing an alternating series of anion selective and cation selective membarnes it is possible to trap both positive and negative ions in areas of higher concentration while depleting other areas of both types of ions. The result is a stream of purified water and a stream of concentrated brine. Although this is an oversimplification of the electrodialytic process, the details of the process will be more clearly described later.

Unfortunately, a common feature of the major commercial desalination methods is the tendency for the equipment to become fouled by components in the feed stream. In distillation heat exchange surfaces become encrusted with a crystalline scale which reduces the rate of heat transfer and raises the energy requirements to purify a given quantity of water. Similarly deposits on the surface of reverse osmosis membranes block the transfer of pure water from a saline solution. Finally, in electrodialysis the anion exchange membranes become contaminated by negatively charged organic materials.

Several approaches have been taken to reduce the problem of fouling of the critical surfaces and to avoid the costly process of shutting down the equipment to mechanically clean and restore these surfaces. In all three desalination processes pretreatment methods have been tried to remove deposit forming materials from the water, but they have proven too costly. In reverse osmosis a method has been used to regenerate the membranes in situ by using solutions capable of removing deposits and restoring or reswelling the membrane.

Another technique to avoid costly dismantling of reverse osmosis equipment has been to form the reverse osmosis membranes dynamically. For example, U.S. Pats. No. 3,503,789 and No. 3,413,219 illustrate the method of forming such membranes. A porous support material is treated in situ with a solution of an appropriate material which coats the support and makes it semipermeable. When the membrane has been fouled by deposits, the support may be flushed clean and a new semipermeable coating may be applied. This technique is advantageous since unlike in situ cleaning and restoration of an old membrane, a new membrane is formed each time and membrane properties are fully recovered.

Prior to my invention, however, these techniques have not been capable of reviving or restoring electrodialysis membranes particularly anionic membranes poisoned by negatively charged organic materials which are extremely difficult to separate from the membrane. As the discussion earlier indicated, the dynamic membranes shown in the patents are not suitable for electrodialysis processes since reverse osmosis membranes perform in a completely different manner. Reverse osmosis membranes allow the passage of water under pressure and prohibit the flow of salt, while electrodialysis membranes allow ions of a particular charge to pass through under the force of an electrical potential and restrict the flow of water and ions of the opposite charge.

It is an object, therefore, of my invention to provide a method for handling the fouling problems in desalination by electrodialysis.

Particularly, it is an object of my invention to provide dynamic electrodialysis membranes.

FIGS. 1, 2, and 3 show specific methods of employing the membranes of my invention. They will be more thoroughly described in the following description of my invention.

THE INVENTION

I have found that the problems of membrane fouling in electrodialysis systems may be overcome by preparing dynamic electrodialysis membranes. These membranes may be formed simply by depositing a thin coating of the appropriate ion exchange resin on a woven or nonwoven fibrous cloth. By bringing the cloth in contact with an aqueous suspension of the resin at a slight applied pressure, resin will be deposited on and in the cloth. The combination of cloth and resin will then be permeable to ions of one electrical charge sign but will restrict the movement of oppositely charged ions. When the membrane is fouled, the cloth may be flushed clean of resin and deposits, and a new layer of resin applied, the whole process being accomplished in situ without costly dismantling and reassembling of the electrodialysis equipment.

While the membranes will be more fully described later, it is important to first understand how such membranes might be incorporated in electrodialysis equipment. For example, three such systems are shown in FIGS. 1, 2, and 3. Each of these systems is highly schematic and could in fact be implemented in a variety of actual equipment designs.

FIG. 1 represents an electrodialysis system in which only the anion membranes are dynamic membranes, since they are more easily fouled. Saline water enters the system through line 1 which feeds cells 2, 3, 4, 5, and 6, which are bounded by alternating anionic and cationic membranes. Cationic membranes 7, 8, and 9 may be any conventional membrane known in the art which allows the passage of cations but substantially rejects anions. For example, beds of cation exchange materials may be used or fixed cationic membranes formed by permanently impregnating a material with cation exchange particles.

Alternating with the cation membranes are anion membranes 10, 11, and 12, the components of membrane 12 being identified for description. In this embodiment each dynamic anion membrane is formed of two parallel walls of fibrous cloth such as walls 13 and 14 in membrane 12. A suspension of anion exchange resin is pumped between these barriers via line 15 and withdrawn by line 16. If the support walls are permeable, solution will flow through it leaving the exterior and interior coated with resin. If the walls are impermeable, the pressure will force the suspension into the cloth to achieve the same result. The layer of resin particles stuck to the cloth walls are represented as 17 and 18 in the figure.

When the support fabric has become completely impregnated by the resin the flow of suspension in line 15 may be stopped substituting saline water in its place. Alternatively, the flow of solution may be continued in line 15 and out through line 16 during the electrodialysis process in which case the effluent in line 16 should be screened to separate the brine from the resin. An advantage of operating in this manner is that any defects in the membrane will be automatically repaired by resin from the solution.

Following formation of satisfactory anionic membranes 10, 11, and 12, an electrical potential may be placed across the series of membranes. This potential is represented in FIG. 1 as a positive electrical charge on the left and a negative electrical charge on the right. At this time the flow of saline water may also begin through line 1 into cells 2, 3, 4, 5, and 6. In operation the pressure between the support walls in anionic membranes 10, 11, and 12 should be slightly greater than that in the cells to insure the "sticking" of the resin to the support walls.

The operation of the electrodialysis apparatus is represented schematically in FIG. 1. For example, in the saline water entering cell 3 the positively charged sodium ions are attracted to the right and the negatively charged chloride ions move in the opposite direction. Following the hypothetical path of a sodium ion in cell 3 in its movement toward the negative pole it will first encounter cation membrane 8 through which it should pass rather freely. Moving through cell 4 the ion will then contact anion membrane 11 which will prevent the further passage of the cation. Similarly a chloride anion in cell 3 will move toward the positive pole, passing through anion membrane 10 but being rejected by cation membrane 7. By tracing the movement of other ions in the system it can be seen that there is a depletion in the ion concentration of cells 3 and 5 and a concentration of these ions in cells 2, 4, and 6. Accordingly, demineralized water may be withdrawn via lines 19, 20, and 21 while brine is removed by lines 22, 23, 24, and 25.

Of course this schematic representation is a drastic oversimplification of the actual process, but it serves to illustrate the general principles of electrodialysis. In reality the ions do not migrate as freely as shown in the drawing but instead the process builds up these concentration gradients slowly and only at the membrane boundaries. Changes in concentration of the bulk of the fluid take place by diffusion into and out of these boundary layers.

As mentioned previously, anion exchange membranes tend to be fouled by deposits of organic materials with slight negative charges. One of the advantages of my invention is that when this point is reached the flow of feed water through line 1 need be interrupted for only a short period of time. During this interlude the dynamic membranes such a membrane 12 are first swept clean of old resin by flushing with a stream of concentrate or saline water pumped through line 15. Resin may be filtered from the effluent in line 16 and when enough resin has been recovered it may be regenerated by conventional techniques for further use. Following this cleansing of old resin, support fibers 13 and 14 are recoated with fresh resin and the desalination process is restarted.

The electrodialysis system illustrated in FIG. 2 is identical to that of FIG. 1 except that both the anion and cation membranes are dynamic. Saline water enters electrodialysis cells 102, 103, 104, 105, and 106 by way of line 1. These cells are separated by alternating cation membranes 107, 109, and 111 and anion membranes 108, 110, and 112. A typical anion membrane 112 comprises woven or non-woven fibrous material which forms the parallel walls 113 and 114. Between these walls a suspension of anion exchange resin is injected through line 115 to form resin layers 117 and 118 on the cloth supports. The remaining solution is withdrawn through line 116.

The cation membranes such as 111 are completely analagous. Cation exchange resin layers 124 and 125 are deposited on cloth supports 120 and 121 from a suspension of cation exchange resin which is injected between the supports via line 122 and withdrawn through line 123.

Again the movements of the cations and anions are schematically represented in the figure and illustrate the function of the membranes. The saline water in cells 103 and 105 is slowly depleted of sodium and chloride ions as it travels through these cells and demineralized water is withdrawn through lines 130, 131 and 132. Ions concentrate in cells 102, 104, and 106 and concentrated brine is withdrawn through lines 133, 134, 135, and 136. The advantage of this system is that both of the membranes may be regenerated when fouled, without disassembling the equipment.

FIG. 3 illustrates an electrodialysis system in which both cation and anion membranes are dynamically formed, but in contrast to the system in FIG. 2 these dynamic membranes are adjacent one another. In other words each repeating unit of a cationic and anionic membrane pair is formed from three barriers rather than four. In FIG. 3 the desalination apparatus is composed of cells 205, 206, 207, 208, 209, 210, and 211 although, of course, more or less of these cells could be used as in the case of the systems in FIGS. 1 and 2.

In this electrodialysis system each membrane pair is a unit such as that formed by membrane cells 218 and 219. This unit contains two cloth supports 220 and 222 separated by permeable barrier 221. Cation exchange resin in suspension is pumped into cell 218 to deposit a layer 223 on support 220 and similarly anion exchange resin suspension is pumped into cell 219 to form a layer of resin 224 on support 222. Because there is no pressure difference across divider 221 and no net flow of water across it, resin will not be deposited on the barrier unless there is a tendency for resin to adhere to the particular divider material used.

In operation saline water is pumped through line 201 and 202 into cell 214 and by lines 201 and 203 into cell 217. An aqueous suspension of cation exchange resin is pumped into membrane cells 212, 215 and 218 via lines 204, 205, 206, and 207. Again, a suspension of anion exchange resin will be pumped into cells 213, 216, and 219 via lines 208, 209, 210, and 211. Following deposition of resin coatings on the fabric supports, the cation and anion exchange loops may also be run on saline water, screening the resin from it when it emerges from the membrane cells.

As illustrated schematically by the migration of ions, sodium and chloride ions will be trapped in cells 212, 213, 215, 216, 218, and 219. The effluent emerging from these cells in lines 228, 229, 230, 231, 232, and 233 are screened of resin and collected as brine in line 234. The water in cells 214 and 217 are depleted of ions as illustrated schematically and demineralized water is collected in lines 225, 226, and 227.

In addition to use in the three specific desalination methods shown in the figures, it is also possible to use dynamic electrodialysis membranes in other systems, for example, the tortuous flow path electrodialysis system shown in U.S. Pat. No. 2,708,658 to Rosenberg. By using dynamic membranes, only the area over which the separation takes place in the tortuous flow apparatus will be covered by ionic material. This would eliminate the lateral shorting problem caused when portions of conventional ion exchange membranes extend into the gasketed area and carry current into that area.

No matter what equipment design is used, the dynamic electro-dialysis membranes are prepared in basically the same way. First, a support material must be chosen. As mentioned previously, this will generally be a woven or non-woven fabric and can include such common materials as commercially available cloths and fabrics, cellulosic materials including paper, and conventional laboratory and industrial filter papers, and other common porous sheets such as tea bag paper. In general, any support material may be used which meets the requirements of structural integrity and when combined with the resin is permeable to the ions of one particular electrical charge sign.

Similarly a large number of cation and anion exchange resins may be used. Typically, commercially available ion exchange resins may be used. Generally these materials are based on synthetic resins usually polystyrene co-polymerized with divinylbenzene. The cation exchange resins generally contain bound sulfonic acid, carboxylic, phosphonic or phosphinic groups. The anion exchange resins contain quaternary ammonium groups or other positively charged groups. A list of some suitable ion exchange resins is given on pp. 1492-8 of the Handbook of Chemistry and Physics, published by the Chemical Rubber Publishing Co., 44th edition and herein incorporated by reference.

In forming the membrane an aqueous suspension of the resin is prepared and the support is subjected to the suspension for a time sufficient to allow resin to adhere to the support. The suspension may be prepared using either fresh water, demineralized product water, or the saline feed water. It is also advantageous to pump the suspension into the membrane cell at a slight pressure of up to 10 p.s.i. to promote coating of the support. As mentioned previously, if the support is water permeable, the flow of solution through the support will effectively coat the internal passages of the support with resin. If the support material is impermeable to water, the applied pressure will force the solution into the support to effectively coat the interior thereof with resin. The support material will usually be treated with ion exchange resin until its pores are filled or its surface completely coated. Although smaller amounts of resin could be coated thereon the efficiency of the membranes would be reduced.

Modifications of this general technique of applying the ion exchange resin can be made depending on the particular ion exchange resin and support employed. Most of these variations are directed at giving the resin-support attachment some degree of durability. For example, binders may be employed in the resin suspension to promote sticking of the resin to the support. Following the application of the resin it is also possible to use a separate solution of a binder for promoting adhesion. Suitable binders include such materials as gelatin and adhesives such as those shown in U.S. Pat. No. 3,556,305 herein incorporated by reference. Finally, it may also be desirable prior to start up of the electrodialysis process to remove any solution from the membrane cell and to air dry the membrane by blowing air through the compartment. These techniques are desirable for increasing durability without causing formation of a permanent membrane.

While this specification has been directed to the use of dynamic electrodialysis membranes for desalination, they may also be used in electrodialysis processes modifying the composition of solutions containing dissolved electrolytes. Such processes include modifying the composition of blood, changing the pH of citrus juices, demineralizing whey and softening water.

The following examples illustrate my invention although my invention should not be limited thereto.

Example 1

A four-compartment, laboratory-size electrodialysis cell was constructed with one-inch thick cylindrical compartments having an open cross sectional area of 7.92 square centimeters. The first compartment was bounded by an electrode (the cathode) and a commercial cation-selective membrane (Ionics CR–61), a sulfonated styrene divinylbenzene copolymer. The second compartment was bounded by the cation-selective membrane and a commercial filter paper. The third cell was bounded by this filter paper and a commercial anion exchange membrane (Ionics AR–111), a styrene divinylbenzene copolymer containing quaternary ammonium groups. The fourth compartment was bounded by the anion exchange membrane and an electrode (the anode).

A 2% suspension of an ion exchange resin (stryene divinylbenzene copolymer containing quaternary ammonium groups Rohm & Haas IRF–119) was prepared by grinding the resin to pass a 325 mesh screen and adding it to 260 grams of distilled water. A flocculating agent was prepared by diluting 8.5 grams of an anionic polyelectrolyte copolymer of methacrylic acid and ethyl acrylate (Rohm & Haas Primafloc A–10) in 86 grams of water and adding 5.5 grams of a 10% sodium hydroxide solution. This solution was diluted with 100 grams of water and 12 grams of the final solution were added to the resin suspension. The flocculating agent acted as a binder in securing the resin to the support.

A coating of resin particles was placed on the filter paper by pouring the suspension into the third compartment of the test cell and removing the filtrate that came through the filter into the second compartment. A 6% solution of gelatin in distilled water was then poured into the third compartment and the filtrate again drained from the second cell. The resin impregnated filter was then dried by blowing air through the third compartment for 15 minutes.

The cells of the electrodialysis test equipment were rinsed with sodium chloride solution and a solution of 31.57 meq./l. added to the compartments. A voltage of 53 volts was applied across the cell, giving a current of 80 ma. The test was continued for one hour. The solution in the second compartment was then drained and found to contain 25.66 meq./l. The current efficiency for the demineralization was calculated to be 65%. Knowing the properties of the permanent cation exchange membrane, it was calculated that the transport number of the dynamic electrodialysis membrane was 0.7.

Example 2

The same test cell of the previous example was used except that instead of commercial filter paper the support for the dynamic membrane consisted of two commercial filtration screens of cellulosic material. The one facing the second compartment had a pore size of 7 microns while the one facing the third compartment had a pore size of 177 microns. The two screens were held tightly together.

A 2% solution of anion exchange resin (Rohm & Haas IRF–119 ground to pass a 325-mesh screen) was prepared in 65 ml. of distilled water. A similar solution was prepared using another styrene divinylbenzene copolymer containing quaternary ammonium groups (Rohm & Haas XE–255). To these suspensions was slowly added 3 grams of the polyelectrolyte flocculating agent used in Example 1.

The suspension of IRF–119 anion exchange resin was poured into the third compartment of the test cell and the filtrate drained from the second compartment to produce a coating of the resin on the screens. The same procedure was followed using the suspension of XE–255 anion exchange resin.

The test cell was again rinsed with a 2,000 p.p.m. sodium chloride solution. The compartments were then filled with a salt solution containing 33.91 meq./l. and a voltage of 45 volts was applied across the cell. At the end of one hour the solution in the second cell was found to contain 12.66 meq./l., giving a current efficiency for the demineralization of 64.9 percent. The dynamic electrodialysis membrane was calculated to have a transport number of 0.7.

I claim:

1. In a process for modifying the composition of a solution containing dissolved electrolytes by electrodialysis, the improvement comprising: using at least one dynamically formed electrodialysis membrane formed by subjecting a water permeable support material in situ to a suspension of ion exchange resin at a slight applied pressure in order that said resin will permeate and adhere to said support material thereby making it selective to the passage of ions of a particular electrical charge when a subsequent electrical potential is applied across the membrane.

2. The process of claim 1 in which said membrane is an anion exchange membrane.

3. The process of claim 1 in which said membrane is a cation exchange membrane.

4. The process of claim 1 in which said solution containing dissolved electrolytes is saline water.

5. A method for forming electrodialysis membranes comprising: subjecting a water permeable support material in situ to a suspension of ion exchange resin at a slight applied pressure in order that said resin will permeate and adhere to said support material thereby making it selective to the passage of ions of a particular electrical charge when a subsequent electrical potential is applied across the membrane.

6. The method of claim 5 in which said ion exchange resin is a cation exchange resin.

7. The method of claim 5 in which said suspension of an ion exchange resin includes a flocculating agent.

8. The method of claim 5 in which said suspension of an ion exchange resin includes a binder.

9. The method of claim 5 in which following said subjecting of said support material in situ to a suspension of ion exchange resin in order that said resin will permeate and adhere to said support material, said support material and adhered resin are dried in air.

10. The method of claim 5 in which said ion exchange resin is an anion exchange resin.

11. The method of claim 10 in which said anion exchange resin is a copolymer of styrene and divinylbenzene containing quaternary ammonium groups.

12. A process for modifying the composition of a solution containing dissolved electrolytes by electrodialysis comprising:

using electrodialysis membranes formed by subjecting a water permeable support material in situ to a suspension of ion exchange resin in order that said resin will permeate and adhere to said support material thereby making it selective to the passage of ions of a particular electrical charge when an electrical potential is applied across the membrane, operating said process until the electrodialysis membranes become fouled or their performance becomes poor for other reasons, stopping the flow of saline water into the electrodialysis apparatus and removing the electrical potential across the membrane cells, flushing the ion exchange resins from the membrane supports, subjecting the support materials in situ to a suspension of ion exchange resin in order that said resin will permeate and adhere to said support material thereby making it selective to the passage of ions of a particular electrical charge sign when an electrical potential is applied across the membrane, and restoring the flow of saline water and reapplying the electrical potential to resume the electrodialysis process.

13. The process of claim 12 in which said ion exchange resin is a cation exchange resin.

14. The process of claim 12 in which said suspension of an ion exchange resin includes a flocculating agent.

15. The process of claim 12 in which said suspension of an ion exchange resin includes a binder.

16. The process of claim 12 in which following said subjecting of said support material in situ to a suspension of ion exchange resin in order that said resin will permeate and adhere to said support material, said support material and adhered resin are dried.

17. The process of claim 12 in which said ion exchange resin is an anion exchange resin.

18. The process of claim 17 in which said anion exchange resin is a copolymer of styrene and divinylbenzene containing quaternary ammonium groups.

References Cited

UNITED STATES PATENTS

| | | | |
|---|---|---|---|
| 2,721,171 | 10/1955 | Arnold et al. | 204—180 P |
| 3,582,488 | 6/1971 | Zeineh | 204—180 R |
| 3,677,923 | 7/1972 | Bier | 204—180 P |

OTHER REFERENCES

Bier: "Electrophoretic Membrane Processes," pp. 250–1, Electrochemical Society, Boston, Mass. 1968.

Hackh's Chem. Dictionary, p. 533, QD5.H3 (1969) C. 8.

HOWARD S. WILLIAMS, Primary Examiner

A. C. PRESCOTT, Assistant Examiner

U.S. Cl. X.R.

204—296, 301